United States Patent [19]

Wenske et al.

[11] Patent Number: 4,491,521

[45] Date of Patent: Jan. 1, 1985

[54] DEWATERING APPARATUS

[75] Inventors: Rolf Wenske, Ravensburg-Torkenweiler; Hans Schnell, Mengen; Peter Mirsberger, Weingarten, all of Fed. Rep. of Germany

[73] Assignee: Escher Wyss GmbH, Ravensburg, Fed. Rep. of Germany

[21] Appl. No.: 412,198

[22] Filed: Aug. 27, 1982

[30] Foreign Application Priority Data

Sep. 29, 1981 [CH] Switzerland ........................ 6253/81

[51] Int. Cl.[3] ........................ B01D 33/04; D21F 1/80

[52] U.S. Cl. .................................. 210/401; 100/118; 162/300; 162/301; 162/305; 210/400

[58] Field of Search ............... 162/300, 301, 203, 205, 162/272, 305, 336; 210/400, 401; 100/118

[56] References Cited

U.S. PATENT DOCUMENTS

| | | | |
|---|---|---|---|
| 1,875,075 | 8/1932 | Mason | 162/301 |
| 3,215,593 | 11/1965 | Green | 162/301 |
| 3,311,533 | 3/1967 | De Montigny et al. | 162/203 |
| 3,847,731 | 11/1974 | Arledter | 162/301 X |
| 3,944,464 | 3/1976 | Means | 162/352 |
| 3,951,809 | 4/1976 | Kollmar | 210/241 |

FOREIGN PATENT DOCUMENTS

| | | | |
|---|---|---|---|
| 363872 | 1/1981 | Austria . | |
| 1964950 | 7/1971 | Fed. Rep. of Germany | 210/401 |
| 2305547 | 9/1973 | Fed. Rep. of Germany | 210/401 |
| 2751849 | 5/1979 | Fed. Rep. of Germany | 210/400 |
| 507682 | 4/1976 | U.S.S.R. | 162/301 |

OTHER PUBLICATIONS

"Escher Wyss Maschinen und Anlagen für die Stoffaufbereitung", 1977, pp. 22 and 23.

*Primary Examiner*—William Smith
*Assistant Examiner*—K. M. Hastings
*Attorney, Agent, or Firm*—Werner W. Kleeman

[57] ABSTRACT

A dewatering apparatus is disclosed containing a pre-dewatering funnel possessing pervious walls over which there are guided two wires. Arranged after the pre-dewatering funnel are two dewatering cylinders over which both of the wires are guided along a substantially S-shaped path of travel. A press roll is arranged after the last dewatering cylinder, this press roll coacting with further press rolls.

15 Claims, 4 Drawing Figures

DEWATERING APPARATUS

BACKGROUND OF THE INVENTION

The present invention relates to a new and improved construction of a dewatering apparatus for dewatering water-solid mixtures, especially suspensions of fiber stock, for instance cellulose or paper fibers, and which is of the type containing two wires which coactingly form with one another an infeed funnel, wherein the two wires are guided over a dewatering cylinder and thereafter pass through at least one press location.

Such type of dewatering apparatus has been disclosed to the art, for instance, in the German language brochure entitled "Escher Wyss Maschinen und Anlagen für die Stoffaufbereitung", at pages 22 and 23, under the designation "Siebpresse".

SUMMARY OF THE INVENTION

It is a primary object of the present invention to improve upon this prior art construction of dewatering apparatus which has found acceptance in practice, specifically with the intent of reducing the costs of the dewatering apparatus while providing a decisively greater capacity or efficiency.

Still a further significant object of the present invention is directed to a new and improved dewatering apparatus which is relatively simple in construction and design, quite economical to manufacture, extremely reliable in operation, not readily subject to breakdown or malfunction, and requires a minimum of maintenance and servicing.

A further important object of the present invention is directed to a simplified construction of dewatering apparatus which provides for a high dewatering capacity for the dewatering of various water-solid mixtures, especially suspensions of fiber stocks.

Now in order to implement these and still further objects of the invention, which will become more readily apparent as the description proceeds, the dewatering apparatus of the present development is manifested by the features that, the infeed or inlet funnel is constructed as a pre-dewatering funnel containing pervious walls in the manner of wire tables, and over which there is guided in each case one of the wires. Furthermore, following the dewatering cylinder there is arranged at least one further dewatering cylinder over which there are guided both of the wires with reversed or opposite curvature, and the dewatering cylinders are free of pressing locations formed by press rolls.

Because of the pre-dewatering path there is formed a thicker solid web between the wires with the same velocity, whereby the capacity or output of the dewatering apparatus is markedly increased. The dewatering cylinders can possess a smaller diameter than would be possible if a single dewatering cylinder were used, and this, in turn, leads to an increase in the dewatering action or effect by virtue of the wire tension. The dewatering cylinders are not subjected to the pressure of press rolls, so that they can be constructed to be lighter and less expensive. By virtue of the fact that the wires are guided over the dewatering cylinders with, in each case, reverse or opposite curvature, that is to say, they are guided in a serpentine path, specifically along a substantially S-shaped path of travel, there is advantageously obtained a displacement of both wires towards one another during passage of the wires over the dewatering cylinders, so that there results a favorable relayering or repositioning of the processed material located between the wires.

The dewatering cylinders can be preferably arranged such that their axes essentially are located in the same horizontal plane, and, in each case, the next following or downstream arranged dewatering cylinder possesses a smaller diameter than the preceding or upstream arranged dewatering cylinder. Due to the arrangement of the axes of the dewatering cylinders in a substantially horizontal plane there are obtained advantageous conditions for the outflow of the expressed or pressed out water. A reduction in the diameter of the subsequently arranged dewatering cylinder, with the same wire tension, results in an increase in the press or pressure force, so that there is obtained an ascending course of such press force, something which likewise favors the dewatering action.

The last dewatering cylinder can have arranged thereafter a first press roll which coacts with at least one second press roll. Since the first press roll does not act, like with the state-of-the-art art arrangement, upon the dewatering cylinder, there is obtained the advantage that the dewatering cylinder can be constructed to be appreciably lighter, and this, in turn, contributes to reducing the costs of the dewatering apparatus. On the other hand, there can be realized an appreciably more intensified pressing or squeezing action between two press rolls than between a press roll and a dewatering cylinder.

Both of the wires can conjointly travel essentially vertically downwardly from the last dewatering cylinder to the first press roll, and the lengthwise axis of the first press roll can be located beneath the lengthwise axis of the last dewatering cylinder at least by the amount of its radius. This arrangement especially allows for catching of the expressed or pressed out water, since there can be arranged at the side of the first press roll a scraper or stripper device provided with an outfeed trough or the like.

The second press roll can be arranged at the side of the first press roll facing away from the second dewatering cylinder. Such constitutes an arrangement which, for reasons of catching the expressed or pressed out material, is advantageous for the withdrawal of the squeezed out water as well as for the accessibility to the rolls.

Preferably, the separation location of both wires from one another can be located at the second press roll. Accordingly, the second press roll can possess a solid surface and can be provided with a removal device for the dewatered fiber stock material. All of these measures lead to an optimum removal or pick-up of the dewatered fiber stock material from the second press roll.

In the event that there is desired an increase in the pressing action, then there can be arranged a third press roll beneath the first press roll. In this way there can be realized an increase in the squeezing or pressing action without any additional spatial requirements, with simultaneous optimum outflow of the expressed or squeezed out water.

The third press roll can preferably possess a grooved or channeled surface and at the same time can serve as a wire guide roll for a related one of the returning wire runs. The grooved surface facilitates outflow of the expressed water from the press locations between the first press roll and the third press roll. By virtue of the fact that the returned wire run is guided over the third press roll there is achieved a simplification in the construction of the dewatering apparatus, since there can be dispensed with the use of an appropriate wire guide roll.

Furthermore, there can be arranged in the pre-dewatering funnel, below its liquid level which is formed during operation, a distributor vat or the like for the infed stock suspension. Beneath the upper boundary or wall of such distributor vat there opens at least one infeed pipe or line for the fiber stock suspension. Consequently, there is attained a uniform distribution of the fiber stock suspension over the width of the dewatering apparatus.

Additionally, the dewatering apparatus can possess a first housing portion at which there are arranged both of the dewatering cylinders and at least one press roll. Further, there can be provided two upper housing portions which serve for supporting a respective one of the previous walls, one of the press rolls as well as for mounting guide rolls for the wires.

A particularly simple construction of the dewatering apparatus can be realized if the housing portions consist of substantially flat or planar side plates and connection plates interconnecting such side plates and extending perpendicular thereto and at least one connection rod. With such construction there is simultaneously obtained an undisturbed outflow of the water.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
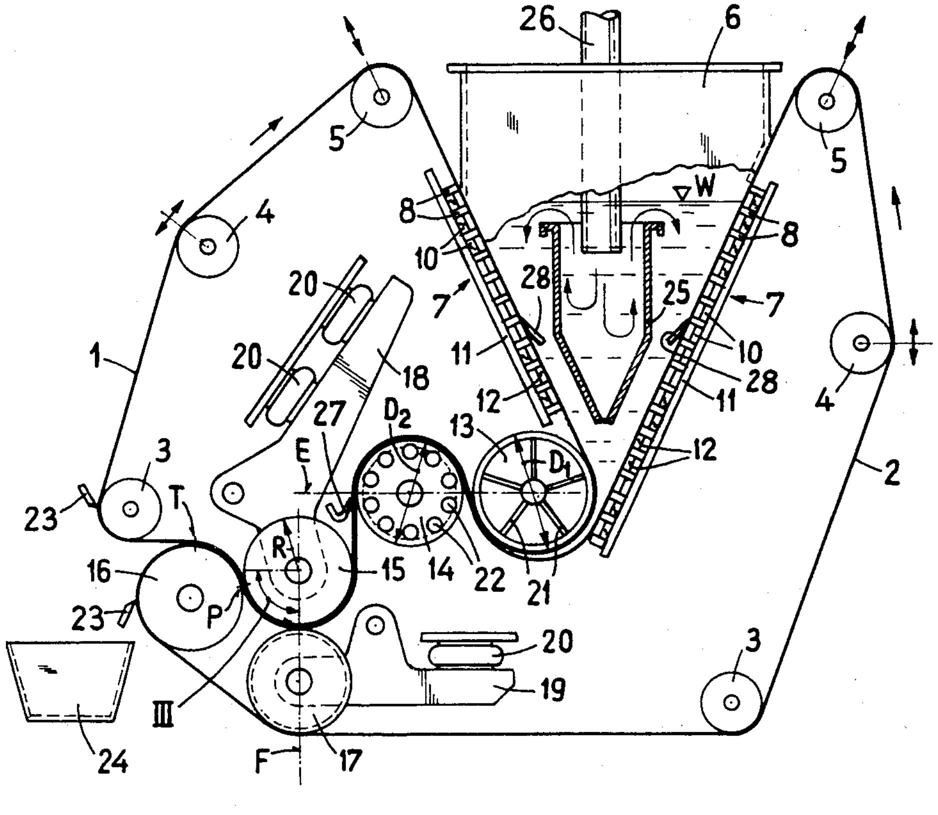
FIG. 1 schematically illustrates a dewatering apparatus and serving to explain the wire guiding and the arrangement of the pre-dewatering funnel together with the dewatering cylinders and press rolls.

Describing now the drawings, it is to be understood that only enough of the construction of the dewatering apparatus has been depicted as will enable those skilled in the art to readily understand the underlying principles and concepts of the present development, while simplifying the illustration of the drawings. Turning attention now specifically to FIG. 1, there has been schematically illustrated an exemplary embodiment of dewatering apparatus, wherein there have been deemphasized in the showing of such FIG. 1 the parts of the housing of such dewatering apparatus in order to more clearly reveal other significant structure thereof. Regarding such dewatering apparatus depicted in detail in FIG. 1, it will be seen that the same contains two wires 1 and 2 which are guided over suitable guide rolls 3, regulation rolls 4 and tensioning rolls 5. A pre-dewatering funnel or funnel member 6 is located at a substantially wedge-shaped region of both wires 1 and 2. This pre-dewatering funnel 6 contains pervious walls or wall members 7 which are constructed in the manner of wire tables and upon which there are moved, during operation of the dewatering apparatus, the two wires 1 and 2, as shown. The pervious walls 7 contain support ledges 8 upon which slidingly downwardly move the wires 1 and 2, respectively. These pervious walls 7 further contain spacer ledges 10 located between the support ledges 8 and support or carrier plates 11 upon which there are affixed the support ledges 8 and the spacer ledges 10, as shown. The water effluxing out of the pre-dewatering funnel 6 through the wires 1 and 2 can laterally outflow through channels 12 between the support ledges 8 and the spacer ledges 10.

Following the pre-dewatering funnel 6 both of the downwardly traveling wires 1 and 2 are conjointly guided over a first dewatering cylinder 13, a second dewatering cylinder 14, a first press roll 15 and a second press roll 16. Coacting with the first press roll 15 is a lower situated third press roll 17. The press rolls 15 and 17 are advantageously mounted upon pivotable press levers or lever members 18 and 19, respectively, which can be actuated by compressed or pressurized air bellows 20 or equivalent actuators, as best seen by referring to FIG. 1.

Both of the dewatering cylinders 13 and 14 are of known construction and provided with an open outer surface, that is to say, their not particularly referenced cylindrical outer surfaces or jackets are equipped, for instance, with bores or continuous slots. The first dewatering cylinder 13 is provided with support walls 21 which enable lateral outflow of the expressed or squeezed out water and water entering from the outside into the interior of the dewatering cylinder 13, as the case may be. The same purpose is also fulfilled by the openings 22 of the dewatering cylinder 14 which extend in the axial direction of such dewatering cylinder.

As will be further recognized by referring to FIG. 1, both of the dewatering cylinders 13 and 14 are arranged with their lengthwise axes located in essentially the same horizontal plane E. Additionally, it will be seen that the diameter $D_2$ of the second dewatering cylinder 14 is smaller than the diameter $D_1$ of the first dewatering cylinder 13.

The first press roll 15 is located beneath the plane E at a spacing which is greater than its roll radius R. Both of the wires 1 and 2 travel between the second dewatering cylinder 14 and the first press roll 15 in an essentially vertical downward direction, as shown in FIG. 1.

The second press roll 16 is located at the side of the first press roll 15 which faces away from the second dewatering cylinder 14. The line-shaped press location or pressure nip P between both of the press rolls 15 and 16 is located in the third quadrant of the first press roll 15, which quandrant has been conveniently designated by reference character III in FIG. 1. The third press roll 17 is located beneath the first press roll 15, and specifically, approximately as illustrated with its lengthwise axis located in a substantially vertical plane F which extends through or contains the lengthwise axis of the coacting first press roll 15.

The separation or parting location T of the wires 1 and 2 is located at the second press roll 16. This second press roll 16 preferably possesses a solid surface, so that the adherence of the expressed material at such press roll 16 is enhanced. This second press roll 16 is furthermore provided with a removal device 23, for instance in the form of a scraper or doctor blade or equivalent structure, which ensures that the expressed or pressed out material will drop off of the surface of the second press roll 16 and from the related wire 2 into a suitable removal container or vat 24.

The pre-dewatering funnel 6 is provided beneath its liquid level W, which regulates or sets itself during operation of the dewatering apparatus, with a distributor vat or trough 25 or equivalent structure. Opening into such distributor vat 25 beneath its upper boundary or end wall is an infeed pipe or conduit 26 for the fiber stock suspension which is to be dewatered.

Figure 2:
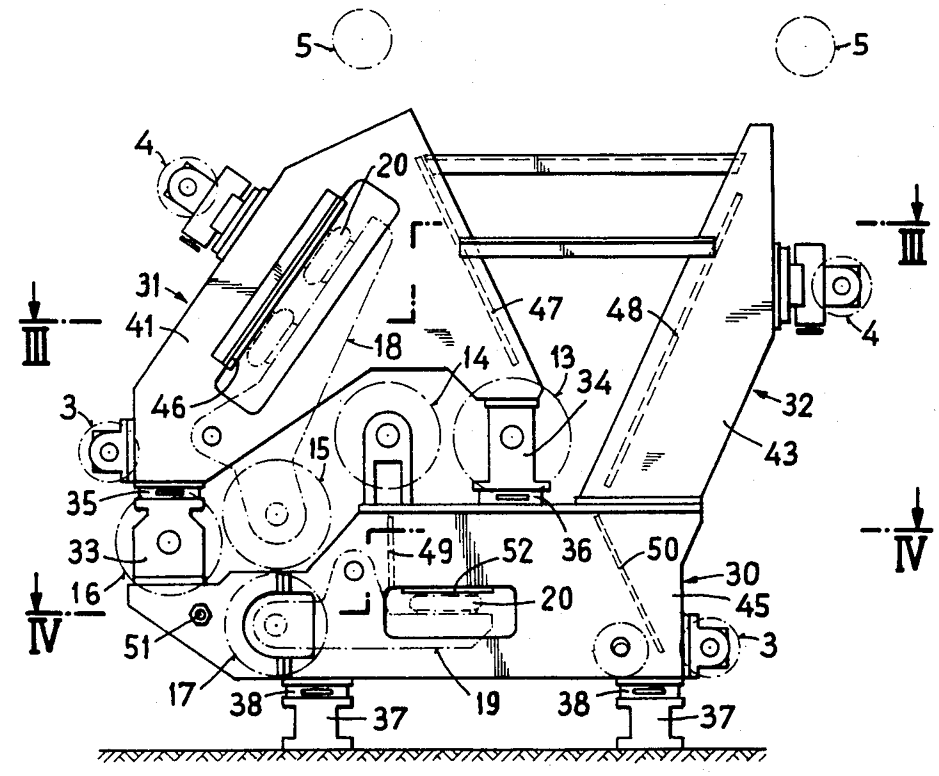
FIG. 2 is a side view of the dewatering apparatus depicted in FIG. 1 and showing details of the construction of the housing arrangement thereof.
Figure 3:
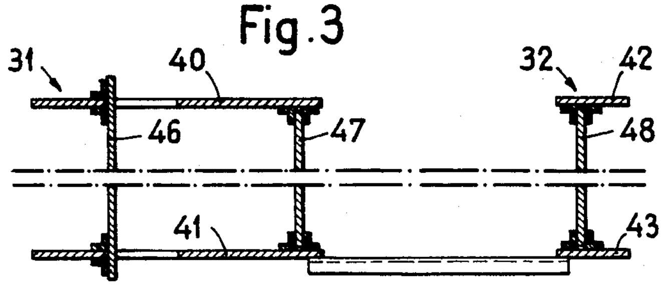
FIG. 3 is a cross-sectional view of the dewatering apparatus depicted in FIG. 2, taken substantially along the section line III—III thereof, and wherein, however, there have only been illustrated the housing parts.
Figure 4:
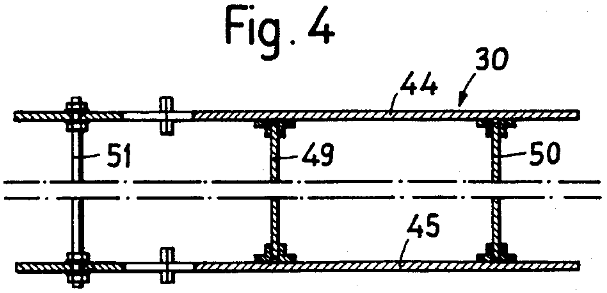
FIG. 4 is a cross-sectional view of the arrangement of FIG. 2, similar to the showing of FIG. 3, but the section this time being taken substantially along the section line IV—IV of FIG. 2.

FIGS. 2 to 4 show details of the construction of the housing apparatus depicted in FIG. 1, wherein for reasons of clarity in the illustration the movable parts illustrated and described in conjunction with such FIG. 1 have only been shown in phantom or broken lines.

According to the showing of FIGS. 2 to 4 the housing of the inventive dewatering apparatus is composed of three housing parts or components, namely, a lower first housing part or portion 30, an upper second housing part or portion 31, and an upper third housing part or portion 32. The housing part 32 is secured to the housing part 30 by any suitable and therefore not particularly illustrated threaded bolts or equivalent fastening expedients. The housing part 31 is attached to the housing part 30 with the aid of the supports 33 and 34 or equivalent attachment structure, which additionally are further provided with removable intermediate parts or elements 35 and 36 which enable removal of the wire 1. In order to dismantle the wire 2 the lower housing part or portion 30 is erected upon similar supports 37 which are operatively associated with the intermediate parts or elements 38. The dismantling of the intermediate parts 35, 36 and 38 is accomplished in conventional manner by a lateral support structure, the so-called cantilevers.

FIGS. 3 and 4 illustrate in sectional view the construction of the housing parts from substantially planar or flat side plates, 40, 41, 42, 43, 44 and 45. The side plates are interconnected by connection plates 46, 47, 48, 49, 50 extending perpendicular thereto as well as by a connection rod or rod member 51. As best seen by reverting to FIG. 2, the connection plates simultaneously have assigned thereat important tasks as concerns the supporting of the individual parts. Thus, there are supported upon the plate member 46 the compressed air bellows 20 of the arm member 18. The plates 47 and 48 simultaneously serve for supporting the wire tables 7. A horizontal plate 52 which is not particularly visible in the sectional view depicted in FIG. 4 which has been taken along the line IV—IV of FIG. 2 but is also shown in FIG. 2 serves for supporting the compressed air bellows 20 of the lever 19.

As also will be apparent by reverting to FIG. 1 of the drawings, the wire 1 is also provided at the region of the guide roll 3 with a scraper 23 or equivalent structure.

At the region between the second dewatering cylinder 14 and the first press roll 15 there is located a combined scraper and vat unit 27 for the outflow of the pressed-out or expressed water.

A further increase in the dewatering capacity or output of the inventive dewatering apparatus can be attained, according to the showing of FIG. 1, in that scraper or stripper devices, for instance scrapers 28, are arranged within the pre-dewatering funnel 6 and serve to remove the previously formed web, so that there can be formed a new web. This new web is formed with a higher stock density of the suspension, something which is advantageous for the output or capacity of the dewatering apparatus.

While there are shown and described present preferred embodiments of the invention, it is to be distinctly understood that the invention is not limited thereto, but may be otherwise variously embodied and practiced within the scope of the following claims. Accordingly,

What we claim is:

1. A dewatering apparatus for dewatering of water-solid mixtures, especially suspensions of fiber stock, in particular cellulose or paper fibers, comprising:
- two movable wires which coactingly form an infeed funnel;
- at least a first dewatering cylinder;
- at least a second dewatering cylinder;
- said two wires being guided over said first and second dewatering cylinders;
- said infeed funnel being constructed as a pre-dewatering funnel containing pervious walls in the manner of wire tables;
- each of said wires being guided over a related one of said pervious walls;
- both of said wires travelling over said first and second dewatering cylinders with reversed curvatures;
- said dewatering cylinders being devoid of press locations formed by press rolls;
- each of said dewatering cylinders has a lengthwise axis;
- said lengthwise axes of said first and second dewatering cylinders being arranged essentially in a common horizontal plane; and
- said second dewatering cylinder possessing a smaller diameter than the first dewatering cylinder which is arranged upstream of said second dewatering cylinder.

2. The dewatering apparatus as defined in claim 1, including:
- a first press roll arranged after the second dewatering cylinder; and
- at least a second press roll with which coacts said first press roll.

3. The dewatering apparatus as defined in claim 2, wherein:
- both of said wires conjointly extend from a last one of said dewatering cylinders essentially vertically downwardly towards said first press roll;
- said first press roll having a lengthwise axis; and
- the lengthwise axis of said first press roll being located at least by the amount of its radius beneath the lengthwise axis of said last dewatering cylinder.

4. The dewatering apparatus as defined in claim 3, wherein:
- said second press roll is arranged at a side of the first press roll facing away from the second dewatering cylinder.

5. The dewatering apparatus as defined in claim 4, wherein:
- both of said wires outfeed away from one another at a predetermined wire separation location;
- said wire separation location for both wires being located at said second press roll;
- said second press roll possessing a solid surface; and a removal device for the dewatered fiber stock material provided for said second press roll.

6. The dewatering apparatus as defined in claim 5, further including:

a third press roll located beneath the first press roll.

7. The dewatering apparatus as defined in claim 6, wherein:

said third press roll having a grooved surface; and said third press roll simultaneously functioning as a wire guide roll for a returned run of a related one of the wires.

8. The dewatering apparatus as defined in claim 1, wherein:

said pre-dewatering funnel has an upper boundary wall;

a distributor vat for the infed fiber stock suspension arranged within the pre-dewatering funnel beneath a liquid level thereof which adjusts itself during operation; and at least one infeed pipe for the fiber stock suspension opening beneath the upper boundary wall of the pre-dewatering funnel and into the distributor vat.

9. The dewatering apparatus as defined in claim 2, further including:

a first housing portion at which there are supported both of said dewatering cylinders and at least one of said press rolls; and two upper housing portions which serve for supporting a respective one of the pervious walls, at least one of the press rolls and for mounting guide rolls for the wires.

10. The dewatering apparatus as defined in claim 9, wherein:

said housing portions comprise substantially planar side plates and connection plates extending perpendicular to said planar side plates and interconnecting said planar side plates.

11. The dewatering apparatus as defined in claim 9, wherein:

said housing portions comprise substantially planar side plates and at least one connection rod member interconnecting said substantially planar side plates.

12. The dewatering apparatus as defined in claim 1, wherein:

said infeed funnel which is constructed as a pre-dewatering funnel containing pervious walls in the manner of wire tables is provided with spaced support ledges upon which slidingly move the wires.

13. The dewatering apparatus as defined in claim 12, wherein:

the spaced support ledges of each of said pervious walls of the pre-dewatering funnel over which travels the related wire extend transversely with respect to the direction of movement of the related wire;

each of said pervious walls further containing spacer ledges located between said support ledges; and support plates at which there are attached said support ledges and spacer ledges.

14. The dewatering apparatus as defined in claim 12, wherein:

said spaced support ledges defining outflow channels therebetween for enhancing outflow of the water contained in the water-solid mixture.

15. The dewatering apparatus as defined in claim 14, further including:

spacer ledges arranged between said spaced support ledges for maintaining said spaced support ledges in spaced relationship from one another in order to define therebetween said outflow channels.

* * * * *

UNITED STATES PATENT AND TRADEMARK OFFICE

CERTIFICATE OF CORRECTION

PATENT NO. : 4,491,521

DATED : January 1, 1985

INVENTOR(S) : ROLF WENSKE et al

It is certified that error appears in the above-identified patent and that said Letters Patent is hereby corrected as shown below:

Column 3, line 21, please delete "previous" and insert --pervious--

Column 4, line 59, please delete "quandrant" and insert --quadrant--

Signed and Sealed this

*Fourth* Day of *June 1985*

[SEAL]

*Attest:*

DONALD J. QUIGG

*Attesting Officer* *Acting Commissioner of Patents and Trademarks*